(12) United States Patent
Westerberg et al.

(10) Patent No.: US 9,277,589 B2
(45) Date of Patent: Mar. 1, 2016

(54) WIRELESS ACCESS POINT CONNECTED TO TWO COMMUNICATION NETWORKS

(75) Inventors: Erik Westerberg, Enskede (SE); Jari Vikberg, Järna (SE); Gunnar Mildh, Sollentuna (SE); Göran Rune, Linköping (SE); Henrik Basilier, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/634,084

(22) PCT Filed: May 15, 2012

(86) PCT No.: PCT/SE2012/050518
§ 371 (c)(1),
(2), (4) Date: Sep. 11, 2013

(87) PCT Pub. No.: WO2013/172751
PCT Pub. Date: Nov. 21, 2013

(65) Prior Publication Data
US 2013/0343292 A1     Dec. 26, 2013

(51) Int. Cl.
*H04W 76/02*     (2009.01)
*H04W 88/10*     (2009.01)
(Continued)

(52) U.S. Cl.
CPC .......... *H04W 88/10* (2013.01); *H04W 28/0289* (2013.01); *H04W 28/08* (2013.01);
(Continued)

(58) Field of Classification Search
CPC ......... H04W 88/06; H04W 8/26; H04W 8/28; H04W 88/10; H04W 12/06; H04W 36/0083; H04W 36/0011; H04W 28/0289; H04W 28/08; H04W 48/10; H04W 84/045; H04W 72/1215; H04W 76/026; H04W 84/12; H04W 36/14; H04L 12/5692; H04L 63/102

USPC ................. 370/331, 328, 329, 332, 334, 315; 455/435.1, 500, 436–445
See application file for complete search history.

(56) References Cited

U.S. PATENT DOCUMENTS

2002/0173272 A1* 11/2002 Liang et al. ..................... 455/63
2005/0245259 A1* 11/2005 Kelly et al. ................ 455/435.1
(Continued)

FOREIGN PATENT DOCUMENTS

EP     2 381 733 A2     10/2011

OTHER PUBLICATIONS

3GPP TS 23.401, "$3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 10)," V10.9.0, Dec. 2012.
(Continued)

*Primary Examiner* — Edan Orgad
*Assistant Examiner* — Ivan O Latorre
(74) *Attorney, Agent, or Firm* — Baker Botts, LLP (57) ABSTRACT

The disclosure concerns a method for providing communication with a mobile station (12) via a first wireless access point (10) as well as the access point. The mobile station (12) has a first identifier for use in a first communication network (14) and the wireless access point comprises a first wireless interface for a first type of wireless communication with mobile stations in relation to the first communication network (14), a second wireless interface for a second type of wireless communication with mobile stations in relation to a second communication network (16), a mapping unit associating the first type of wireless communication for the mobile station with the second type of wireless communication for the mobile station based on the first identifier and a traffic control unit transporting traffic of wireless communication of the second type for the mobile station through the first communication network (14) based on the association.

23 Claims, 4 Drawing Sheets

(51) Int. Cl.
*H04W 28/08* (2009.01)
*H04W 28/02* (2009.01)
*H04W 72/12* (2009.01)
*H04W 36/14* (2009.01)
*H04W 88/06* (2009.01)
*H04W 84/12* (2009.01)

(52) U.S. Cl.
CPC ............ *H04W76/026* (2013.01); *H04W 36/14* (2013.01); *H04W 72/1215* (2013.01); *H04W 84/12* (2013.01); *H04W 88/06* (2013.01)

(56) References Cited

U.S. PATENT DOCUMENTS

| | | | |
|---|---|---|---|
| 2006/0128362 A1* | 6/2006 | Bae et al. .................... | 455/411 |
| 2007/0110009 A1* | 5/2007 | Bachmann et al. ........... | 370/338 |
| 2008/0244148 A1* | 10/2008 | Nix et al. ..................... | 710/313 |
| 2009/0180451 A1* | 7/2009 | Alpert ............... | H04W 72/1215 370/338 |
| 2009/0313466 A1* | 12/2009 | Naslund et al. ............... | 713/155 |
| 2010/0056136 A1* | 3/2010 | Zhu ..................... | H04B 7/2606 455/426.1 |
| 2010/0120399 A1* | 5/2010 | Guo et al. .................... | 455/411 |
| 2011/0149928 A1 | 6/2011 | Wu et al. | |
| 2011/0242969 A1* | 10/2011 | Dayal ............... | H04W 36/0055 370/225 |
| 2012/0289170 A1* | 11/2012 | Li et al. ........................ | 455/73 |
| 2013/0095789 A1* | 4/2013 | Keevill et al. ............... | 455/411 |
| 2013/0102313 A1* | 4/2013 | Tinnakornsrisuphap et al. ............................. | 455/436 |
| 2013/0273857 A1* | 10/2013 | Zhang et al. .................... | 455/73 |
| 2014/0204832 A1* | 7/2014 | Van Phan et al. ............. | 370/315 |

OTHER PUBLICATIONS

3GPP TS 23.402, "3$^{rd}$ Generation Partnership Project; Technical Specification Group Services and System Aspects; Architecture Enhancements for Non-3GPP Accesses," V10.8.0, Sep. 2012.

Written Opinion issued in International Application No. PCT/SE2012/050518 dated Mar. 13, 2013.

International Search Report issued in International Application No. PCT/SE2012/050518 dated Mar. 13, 2013.

Ahmed, et al., "Multi Access Data Network Connectivity and IP Flow Mobility in Evolved Packet System (EPS)," IEEE, Apr. 18, 2010.

3GPP TS 23.261, "3$^{rd}$ Generation Partnership Project; Technical Specification Group Services and System Aspects; IP Flow Mobility and Seamless Wireless Local Area Network (WLAN) Offload; Stage 2 (Release 10)," V10.2.0, Mar. 2012.

* cited by examiner

WIRELESS ACCESS POINT CONNECTED TO TWO COMMUNICATION NETWORKS

This application is the U.S. national phase of International Application No. PCT/SE2012/050518 filed 15 May 2012 which designated the U.S., the entire contents of which is hereby incorporated by reference.

TECHNICAL FIELD

The disclosure generally relates to communication networks. More particularly, the disclosure relates to a method for providing communication with a mobile station via a first wireless access point and a wireless access point for providing communication with a mobile station.

BACKGROUND

Wireless Local Area network technology such as IEEE 802.11, also denoted Wireless Fidelity (Wi-Fi) is today becoming more and more popular in order to for instance provide hostspots where mobile stations can communicate.

At the same time mobile communication networks exist, which are focused on mobility.

These two types of networks may furthermore be co-located; they may exist in the same geographical location. However, a mobile terminal using one type of network will then typically have to disconnect from this network before connecting to the other network.

The current Wi-Fi deployments are thus mainly totally separate from mobile networks, and are to be seen as non-integrated. The usage of Wi-Fi is mainly driven due to the free and wide unlicensed spectrum, and the increased availability of Wi-Fi in mobile terminals like smartphones and tablets. The end users are also becoming more and more at ease with using Wi-Fi for example at offices and homes.

There may in such situations exist a desire to combine these networks. One situation where this may be of interest is if there is congestion in one of the networks. Then it would be advantageous to switch over to the other network for some traffic. However such switchover should then be as seamless as possible. Another reason for providing them combined is to improve user experience.

There is thus a need for an improvement in the combining of these two different types of communication technologies. It is furthermore a need for a combining where signalling between core elements of the two networks is limited.

SUMMARY

One object of the disclosure is to limit the amount of signalling being performed between a first and a second communication network to which a first wireless access point is connected.

The object is according to a first aspect achieved through a method for providing communication with a mobile station via a first wireless access point. The first wireless access point comprises a first wireless interface for a first type of wireless communication with mobile stations in relation to a first communication network and a second wireless interface for a second type of wireless communication with mobile stations in relation to a second communication network. The mobile station has at least one first identifier provided for use in the first communication network. The method is performed in the first wireless access point and comprises:
associating the first type of wireless communication for the mobile station with the second type of wireless communication for the mobile station based on said first identifier, and transporting traffic of the second type of wireless communication for the mobile station through the first communication network based on the association.

The object is according to a second aspect achieved through a wireless access point for providing communication with a mobile station having at least one first identifier provided for use in a first communication network. The first wireless access point comprises:
a first wireless interface (W1) for a first type of wireless communication with mobile stations in relation to the first communication network,
a second wireless interface for a second type of wireless communication with mobile stations in relation to a second communication network,
a mapping unit configured to associate the first type of wireless communication for the mobile station with the second type of wireless communication for the mobile station based on said first identifier, and
a traffic control unit configured to transport traffic of wireless communication of the second type for the mobile station through the first communication network based on the association.

The mobile station may be a dual mode station using the first identifier for communicating with the first communication network and a second identifier for communicating with the second communication network.

In a first variation of the first aspect, the associating of the first type of wireless communication for the mobile station then comprises associating the second identifier with the first identifier for enabling the transporting.

In a first variation of the second aspect the mapping unit when associating the first type of wireless communication for the mobile station is then further configured to associate the second identifier with the first identifier for enabling the transporting.

There may furthermore exist a unique identifier associated with the mobile station in the first communication network and a unique identifier associated with the mobile station in the second communication network. The first identifier may also be a temporary identifier associated with the mobile station in the first communication network.

In a second variation of the first aspect, the method further comprises obtaining the unique identifier associated with the mobile station in the first communication network from at least one network node in the first communication network and performing the associating of the first identifier with the second identifier if the unique identifier of the first communication network matches the unique identifier of the second communication network.

In a second variation of the second aspect, the mapping unit is further configured to obtain the unique identifier associated with the mobile station in the first communication network from at least one network node in the first communication network and perform the associating of the first identifier with the second identifier if the unique identifier of the first communication network matches the unique identifier of the second communication network.

The at least one network node may comprise a mobility management node. It may also comprise a serving gateway node.

The second identifier may be the unique identifier of the second communication network.

Alternatively the second identifier may be a temporary identifier associated with the mobile station in the second communication network.

In the latter case the method may further comprise obtaining the unique identifier of the second communication network from a network node in the second communication network.

In the latter case the mapping unit of the wireless access point may be further configured to obtain the unique identifier of the second communication network from a network node in the second communication network.

According to a further variation of the first aspect, the method comprises obtaining a temporary identifier of the first communication network associated with the unique identifier of the second communication network from a network node in the second communication network and performing said associating if the obtained temporary identifier matches the first identifier.

According to a corresponding variation of the second aspect, the mapping unit of the wireless access point is further configured to obtain a temporary identifier of the first communication network associated with the unique identifier of the second communication network from a network node in the second communication network and perform said associating if the obtained temporary identifier matches the first identifier.

According to another variation of the first aspect, the associating of the first type of wireless communication to the second type of wireless communication further comprises associating a communication address assigned to the mobile station in the first communication network to a communication address assigned to the mobile station in the second communication network and to a communication address of the mobile station used via the second wireless interface.

According to a corresponding variation of the second aspect, the mapping unit, when performing the associating of the first type of wireless communication to the second type of wireless communication is further configured to associate a communication address assigned to the mobile station in the first communication network to a communication address assigned to the mobile station in the second communication network and to a communication address of the mobile station used via the second wireless interface.

According to a further variation of the first aspect, the method further comprises performing packet conversion according to the association in relation to transported traffic.

According to a corresponding variation of the second aspect, the traffic control unit is configured to perform packet conversion according to the associations made by the mapping unit.

According to yet another variation of the first aspect, the method further comprises forwarding data about the association to a second wireless access point in order to allow the mobile station to be handed over to the second wireless access point.

According to a corresponding variation of the second aspect, the wireless access point further comprises a handover handling unit configured to forward data about the association to another wireless access point in order to allow the mobile station to be handed over to the other wireless access point.

The first communication network may be a System Architecture Evolution/Long Term Evolution network and the first wireless interface may be an eNodeB Uu interface of the System Architecture Evolution/Long Term Evolution network.

The second communication network may be a core network and the second wireless interface may be an IEEE 802.11 interface of a wireless local area network.

The aspects mentioned above have many advantages. They provide a low amount of signalling between the first and the second communication network in relation to the dual use of the first communication network. The first communication network may furthermore not need to be aware of a mobile station moving between the first and second wireless interfaces, which simplifies operation of the first communication network.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

A more detailed description will now be made in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the disclosure. However, it will be apparent to those skilled in the art that the material described herein may be practiced in other embodiments that depart from these specific details. In other instances, detailed descriptions of well-known devices, circuits, and methods are omitted so as not to obscure the description with unnecessary detail.

Figure 1:
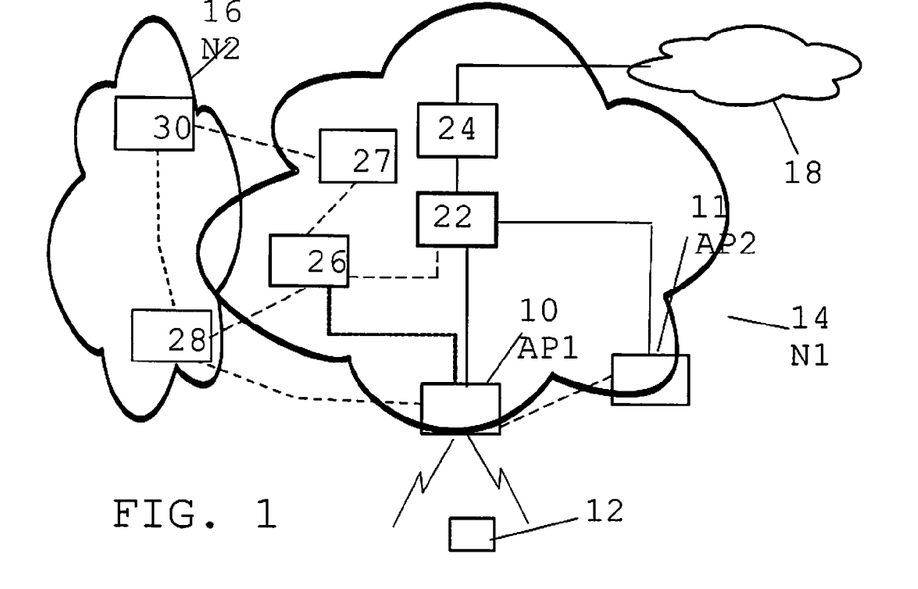
FIG. 1 schematically shows a first and a second communication network, a first wireless access point that is common for the two networks and a mobile station communicating with the first wireless access point.

In FIG. 1 there is shown a first communication network N1 14. This communication network is here also a mobile communication network, which as an example is an Evolved Packet System (EPS) network. An EPS network may comprise a Radio Access Network (RAN) and a core network. In EPS the Radio Access Network is called Evolved Universal Terrestrial Radio Access Network (E-UTRAN). The core network, to which E-UTRAN is connected is called Evolved Packet Core (EPC), a.k.a. System Architecture Evolution (SAE) network. This means that the E-UTRAN and the EPC together form the Evolved Packet System (EPS). EPS is also known as an SAE/LTE network, where another name used for E-UTRAN is Long Term Evolution (LTE) Radio Access Network (RAN). This first communication network 14 comprises a number of nodes. It comprises a Mobility Management Entity (MME) node 26, a Home Subscriber Server (HSS) node 27, a serving gateway node 22 and a Packet Data Network (PDN) gateway node 24. There is here also provided a second communication network N2 16, which is a wireless local area network (WLAN). This type of network is also denoted a Wireless Fidelity (Wi-Fi) network. The second communication network comprises an access control node 28 and an Authentication Authorization, Accounting (AAA) server 30. It should here be realized that it is possible with further nodes in both the networks. However, these have been omitted in order to provide a clearer description.

There are here further a first wireless access point AP1 10 and a second wireless access point AP2 11 in the first communication network 14. These are both access points that are able to communicate wirelessly according to both the Wi-Fi and the LTE standard. The first wireless access point 10 is therefore here shown as communicating with a mobile terminal 12 using both a first type of wireless communication in a first wireless communication mode LTE-Uu of LTE and a second type of wireless communication in a second wireless communication mode 802.11 of Wi-Fi, where 802.11 is the wireless communication mode specified in the standard IEEE 802.11. The first type of wireless communication may therefore be performed in a licensed frequency band, while the second type of wireless communication may be performed in an unlicensed frequency band.

The first wireless access point 10 is for this reason able to communicate with some nodes of the first communication network 14 via a first interface, here denoted an S1 interface, where this interface comprises a first part S1 MME for communication with the MME node 26 and a second part S1-U for communication with the serving gateway node 22. The serving gateway node 22 may communicate with the PDN gateway node via a (GTP) S5 interface, where GTP is the acronym for GPRS (General Packet Radio Access) Tunnelling Protocol. The PDN gateway node 24 communicates with a computer communication network 18 via an SGi interface, which computer communication network 18 may be the Internet. The MME unit 26 communicates with the serving gateway node 22 via an S11 interface and with the HSS node 27 via an S6a interface. If there are other MME nodes in the first communication network 14 then the MME node 26 communicates with these via an S10 interface.

Also the second wireless access point 11 communicates with the MME node 26 and serving gateway node 22. However, only the latter communication is shown in FIG. 1, since the principles of communication used by the second wireless access point 11 is the same as those used by the first wireless access point 10. The two wireless access points 10 and 11 also communicate with each other via an X2 interface.

In the second communication network 16, the first wireless access point 10 communicates with the access control node 28. The access control node 28 in turn communicates with the AAA server 30 via a STa interface. Here there is furthermore an interface between the access control node 28 in the second communication network 16 and the MME node 26 in the first communication network 14 as well as an interface between the AAA server 30 in the second communication network 16 and the HSS server 27 in the first communication network 14. There may also exist an interface between the access control node 28 and the HSS server 27 (not shown).

Figure 2:
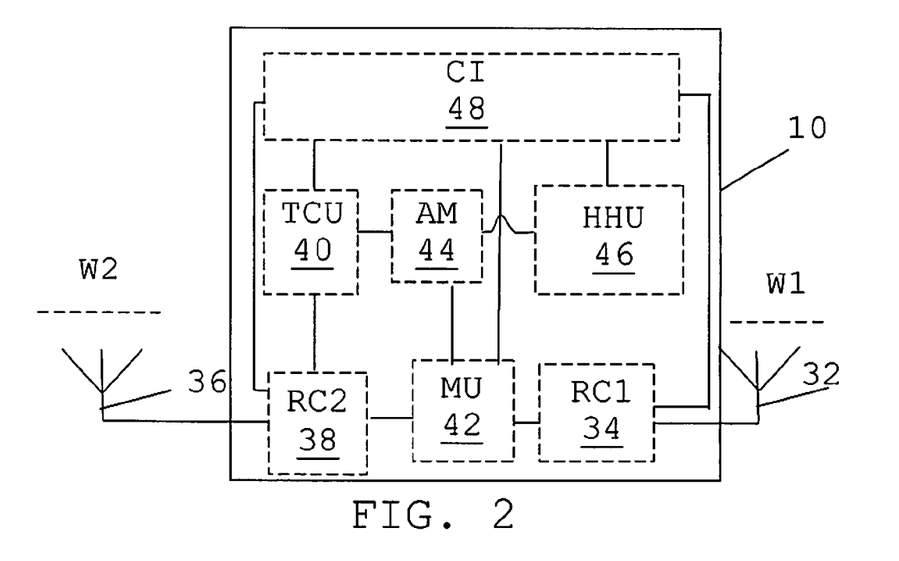
FIG. 2 shows a simplified block schematic of the first wireless access point in FIG. 1, FIG. 3 schematically shows the content of an association memory in the first wireless access point.

FIG. 2 shows a block schematic of the relevant elements of the first wireless access point 10. The first wireless access point 10 comprises a first antenna 32 and first radio communication unit RC1 34 providing a first wireless interface W1 for wireless communication in the first communication mode, i.e. a first type of wireless communication that is wireless LTE communication in relation to the first communication network. The first wireless interface W1 may for instance be an eNodeB Uu interface of LTE.

The first wireless access point 10 also comprises a second antenna 36 and second radio communication unit RC2 38 for providing a second wireless interface W2 for wireless Wi-Fi communication. The second wireless interface W2 is more particularly provided for a second type of wireless communication in relation to the second communication network. The second wireless interface W2 may be an IEEE 802.11 WLAN interface.

Both the radio communication units 34 and 38 are furthermore connected to a mapping unit MU 42 as well as to a communication interface CI 48. The mapping unit 42 is connected to an association memory AM 44 and also to the communication interface 48. There is also a traffic control unit TCU 40 connected to the first radio communication unit 38, the association memory 44 and to the communication interface 48. Finally there is a handover handling unit HHU 46 connected to the association memory 44 and to the communication interface 48. The communication interface implements interface functionality towards nodes in the first and second communication networks. It thus implements for instance S1-U, S1-MME and X2 interfaces as well as a WLAN access point—access controller interface.

Figure 3:
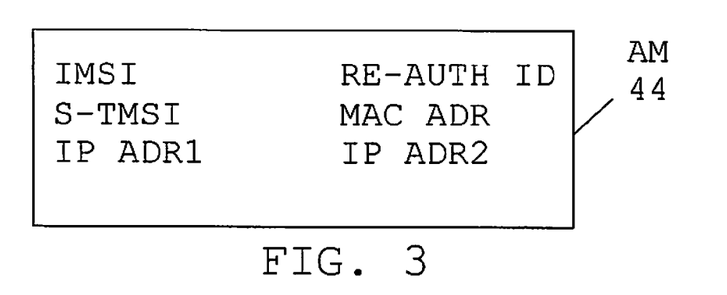

FIG. 3 schematically shows the content of the association memory 44. It may comprise identifiers of the mobile station used in the first communication network. It here comprise a unique identifier of the first communication network in the form of an International Mobile Subscriber Identity (IMSI), a temporary identifier associated with the mobile station in the first communication network in the form of a System Architecture Evolution—Temporary Mobile Subscriber Identity (SAE TMSI) or S-TMSI. It also comprises a first communication address IP ADR1 assigned to the mobile station in the first communication network. It furthermore comprises a temporary identifier, which is a re-authentication identifier, RE_AUTH ID of the mobile station associated with the mobile station in the second communication network, a communication address MAC ADR of the mobile station used via the second wireless interface and a second communication address IP ADR2 assigned to the mobile station in the second communication network. The communication addresses of the first and the second communication networks assigned to the mobile station are with advantage Internet Protocol (IP) addresses.

In mobile communication networks a mobile station is often denoted a User Equipment (UE) and a wireless access point is often denoted base station or for example eNodeB in the LTE case.

Wi-Fi integration towards the mobile core network is emerging as a good way to improve end user experience. These solutions consist mainly of the components:
  common authentication between 3GPP and Wi-Fi, and
  integration of Wi-Fi user plane traffic to the mobile core network.

The common authentication is based on automatic Subscriber Identity Module (SIM)-based authentication in both access types. The Wi-Fi user plane integration provides the mobile operator the opportunity to provide the same services, like parental control and subscription based payment methods, for the end users when connected both via the third Generation Partnership Project (3GPP) and via Wi-Fi.

Different solutions are standardized in 3GPP: Overlay solutions via the interfaces S2b, S2c are specified since 3GPP Rel-8 while integration solutions via the interface S2a are currently work-in-progress (S2a, S2b, S2c indicating the 3GPP interface/reference point name towards the PDN gateway). These solutions are specified in 3GPP TS 23.402.

Wi-Fi integration into Radio Access Network (RAN) may also be of interest. This has basically two different possible levels that could be implemented either separately or together. A first level of integration is to combine both 3GPP and Wi-Fi in the small pico base stations to gain access to the Wi-Fi sites with 3GPP technology and vice versa. The second level of integration is to integrate the Wi-Fi access tighter into the RAN by introducing enhanced network controlled traffic steering between 3GPP and Wi-Fi based on knowledge about the total situation on the different accesses. The driver for this second level of integration could be to avoid potential issues with UE controlled Wi-Fi selection such as selecting Wi-Fi when the Wi-Fi connection is bad or when the UE is moving, thus giving better end user performance and better utilization of the combined Wi-Fi and cellular radio network resources.

Different standards organizations have started to recognize the needs for an enhanced user experience for Wi-Fi access. This process is being driven by 3GPP operators. An example of this is the Wi-Fi Alliance with the Hot-Spot 2.0 (HS2.0) initiative, now officially called PassPoint.

HS2.0 is primarily geared toward Wi-Fi networks. HS2.0 builds on IEEE 802.11u, and adds requirements on an authentication mechanisms and auto-provisioning support.

The momentum of Hot-Spot 2.0 is due to its roaming support, its mandatory security requirements and for the level of control it provides over the mobile station for network discovery and selection. Even if the current release of HS2.0 is not geared towards 3GPP interworking, 3GPP operators are trying to introduce additional traffic steering capabilities, leveraging HS2.0 802.11u mechanisms. Because of the high interest of 3GPP operators, there will be a second release of HS2.0 focusing on 3GPP interworking requirements.

The HS2.0 comprises the following procedures:
1 Discovery: where the mobile station discovers the Wi-Fi networks, and probe them for HS2.0 support, using 802.11u and HS 2.0 extensions.
2 Registration is performed by the mobile station toward the Wi-Fi Hot-spot network if there is no valid subscription for that network.
3 Provisioning: Policy related to the created account is pushed toward the mobile station. This only takes place when a registration takes place.
4 Access: cover the requirements and procedures to associate with a HS2.0 Wi-Fi network.

The Access Network Discovery and Selection Function (ANDSF) is an entity defined by 3GPP for providing access discovery information as well as mobility and routing policies to the UE. The information and policies provided by the ANDSF may be subscriber specific.

ANDSF is thus used to provide access discovery information to the mobile station, which information may assist the mobile station to discover available (3GPP and) non-3GPP access networks without the burden of continuous background scanning.

Inter-System Mobility Policies (ISMP) are policies which guide the mobile station to select the most preferable 3GPP or non-3GPP access. The ISMP are used for mobile stations that access a single access point (3GPP or Wi-Fi) at a time.

Inter-System Routing Policies (ISRP) are policies which guide the mobile station to select over which access a certain type of traffic or a certain access point name (APN) shall be routed. The ISRP are used for mobile stations that access both 3GPP and Wi-Fi.

The different permanent mobile station identifiers are defined in 3GPP TS 23.003.

The International Mobile Subscriber Identity (IMSI) is composed of three parts:
a Mobile Country Code (MCC) comprises three digits. The MCC identifies uniquely the country of a mobile subscriber associated with the mobile station.
b Mobile Network Code (MNC) comprises two or three digits. The MNC identifies the home Public Land Mobile Network (PLMN) of the mobile subscriber. The length of the MNC (two or three digits) depends on the value of the MCC.
c Mobile Subscriber Identification Number (MSIN) identifies the mobile subscriber within a PLMN.

The National Mobile Subscriber Identity (NMSI) comprises of the Mobile Network Code and the Mobile Subscriber Identification Number.

In SAE/LTE, in the Evolved Packet System (EPS) the permanent identifiers are only known in the Evolved Packet Core (EPC) and the Evolved UMTS Terrestrial Radio Access Network (E-UTRAN) is only aware of temporary UE identifiers, where UMTS is the acronym for Universal Mobile Telecommunications System. An example is the Globally Unique Temporary UE Identity (GUTI) that uniquely identifies the MME which allocated the GUTI and also identifies the UE within the MME that allocated the GUTI.

Another example used for paging purposes is the S-TMSI. GUTI and S-TMSI are also defined in 3GPP TS 23.003. The GUTI is allocated to the UE during an Attach procedure as defined in 3GPP TS 23.401 and the serving MME holds the association between the GUTI and the UE permanent identifier(s).

When the mobile station accesses the Wi-Fi network it may be authenticated using Extensible Authentication Protocol Method for GSM Subscriber Identity Module (EAP-SIM) and Extensible Authentication Protocol Method for UMTS Authentication and Key Agreement (EAP-AKA) protocols. The mobile station may in these cases be identified by either the full authentication Network Access Identifier (NAI) or by a fast re-authentication NAI. The full authentication NAI comprises the IMSI of the mobile station and the fast re-authentication NAI is similar to the temporary identifiers used in SAE/LTE access in the sense that it is the 3GPP AAA Server that knows the relation between the fast re-authentication NAI and the full authentication NAI.

The trend when combining Wi-Fi and SAE/LTE is to employ the S2x interface, which leads to the Wi-Fi network connecting to the SAE/LTE network at the PDN gateway. This means that PDN connection is moved between the E-UTRAN and Wi-Fi access networks whenever the mobile station moves between the two accesses. This moving creates unnecessary signalling towards the mobile network.

Some variations are directed towards integrating the Wi-Fi Access network towards the mobile network via the S1-interfaces. This is especially possible in the case when the first wireless access point is a combined access point providing both an LTE base station, such as a Pico eNodeB, and a Wi-Fi access point. This type of solution has the benefit that the mobile core network of the first communication network, is not aware of the user moving between the LTE and Wi-Fi accesses within the same base station as the S1-U bearers are re-used for the user plane traffic in both accesses.

However, this re-use of S1-U bearers also creates new problems as different types of mobile station identifiers are used in the LTE and Wi-Fi accesses. The IMSI may be available when the mobile station accesses via Wi-Fi but in the LTE access only temporary mobile station identifiers are normally used. There is therefore a need to tie together the mobile station accessing via the LTE Access with the same mobile station accessing via the Wi-Fi Access so that the same mobile station S1-interface may be used towards the mobile core network.

One concept of this disclosure is that one wireless access point provides two different types of wireless communication, for instance through being a combined LTE eNodeB and Wi-Fi access point, and transports traffic of both these types of wireless communication through the first communication network. This transportation is thus made using the same interface functionality, here the S1 interface, so that one mobile station uses a single and same interface functionality while communicating via either the first or the second wireless interface.

Figure 4:
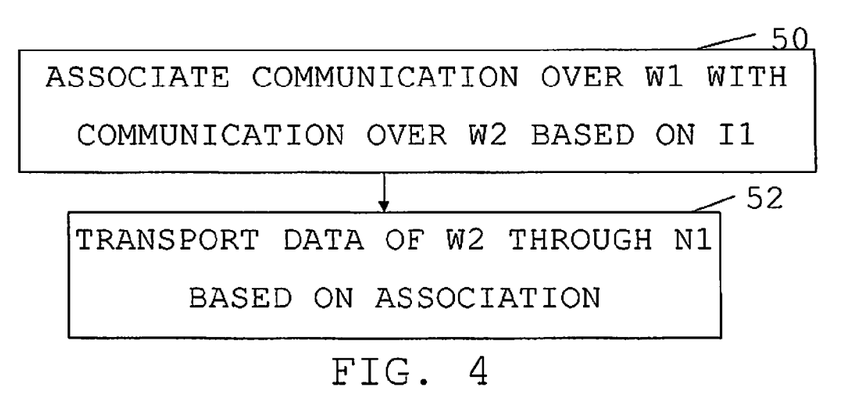
FIG. 4 shows a number of method steps in a first embodiment of a method for providing communication with a mobile station.

A first embodiment of how this may be done will now be described with reference being made to FIG. 4.

This embodiment is thus concerned with using the first communication network for transporting traffic communicated via both the first and the second wireless interface W1 and W2. This means that traffic from the mobile station 12 will pass via the first wireless access point 10, the serving gateway 22 and PDN gateway 24 to the data communication network 18 irrespective of if the first or the second wireless interface W1 and W2 is used. In order to be able to use this functionality, the mobile station may have to be a dual mode station that is able to communicate with the first wireless access point using both the first and second wireless interface W1 and W2.

However, in order to enable the first wireless access point 10 to be used in this way it is necessary that the identifiers of the mobile station 12 used in the two different networks are associated with each other. The identifiers for the mobile station used in the two types of communication modes have to be linked to each other in order to be able to handle traffic in respect of the mobile station 12 in both communication networks 14 and 16.

How this may be done will now be explained with reference being made to FIG. 1-3 as well as to FIG. 4, which shows a number of steps in a method for providing communication with a mobile station of this first embodiment.

The first wireless interface W1 is arranged for providing a first type of wireless communication with mobile stations in relation to the first communication network 14, which is here exemplified by SAE/LTE. The second wireless interface W2 is in the same manner arranged for providing a second type of wireless communication with mobile stations in relation to the second communication network 16, here exemplified by Wi-Fi. There is furthermore a first identifier associated with the mobile station 12, which first identifier is provided for use in the first communication network 14. This first identifier may be a unique identifier such as IMSI or a non-unique temporary identifier such as S-TMSI. There may also be a second identifier associated with the mobile station for communication with the second communication network 16. These identifiers are thus used by the mobile station 12 for communicating through the first wireless access point 10.

In this first embodiment the mapping unit 42 first associates the first type of wireless communication for the mobile station 12 with the second type of wireless communication for the mobile station based on the first identifier, step 50. This means that the communication over the first wireless interface is associated with the communication over the second wireless interface for the first identifier I1. The mapping unit 42 may obtain the data to be associated relating to the first type of wireless communication from the first radio communication unit 34 and obtain the data to be associated relating to the second type of wireless communication from the second communication network 16. The data to be associated varies based on the identifiers that are known. It may however necessary to associate the first identifier I1 used by the mobile station 12 via the first wireless interface W1 with a second identifier used by the mobile station via the second wireless interface. When the first identifier is a temporary identifier like S-TMSI the association may be the association of the unique identifier of the mobile station 12 used in the second communication network 16, which may be the IMSI of the mobile station 12, with the temporary identifier S-TMSI of the mobile station used in the first communication network. In this case the first identifier is a temporary identifier and the second identifier is a unique identifier. The association may also be the association of the unique identifier of the mobile station 12, such as IMSI, used in the first communication network with the unique identifier of the mobile station 12 used in the second communication network, in which case both the first and the second identifiers are unique. The association may also be the association of the temporary identifier S-TMSI of the mobile station 12 used in the first communication network 14, with the temporary identifier RE-AUTH ID of the mobile station 12 used in the second communication network 16, in which case both the identifiers are non-unique temporary identifiers. What is necessary is that the different identifiers used for the same mobile station in the two wireless interfaces are linked together. The mapping unit 42 therefore stores these associations in the association memory 44. After this has been done the traffic control unit 40 then transports traffic of the second type of wireless communication and obtained in relation to the second wireless interface W2 through the first communication network 14 based on the association, step 52, i.e. based on the associating of identifiers. Here it may consult the association memory 44 when performing the transporting.

The transporting may involve injecting user plane traffic in a GTP-U tunnel provided for the mobile station 12 in the first communication network 14.

After this has been done it is then possible for the traffic control unit 40 to select the type of wireless access that is desired. It is for instance possible for the mobile station 12 to be connected to the first wireless access point 10 using both wireless interfaces W1 and W2 simultaneously or one after the other and transferring the traffic through the first communication network. It should here be realized that in some instances traffic may be transferred through the second communication network as well. However it is possible for the traffic control unit 40 to select the communication network through which traffic provided via the second wireless interface is to be conveyed. If for instance the mobile station 12 is stationary and the user of the mobile station 12 is involved in an activity where Wi-Fi is preferred, the traffic of the activity may then be communicated via the second wireless interface W2 and transported via the first communication network. If however the mobile station 12 starts to move and for instance starts to move in a direction where the risk of handover to a wireless access point lacking Wi-Fi connectivity, then the traffic control unit 42 of the first wireless access point 10 may select to use of LTE, in which case the mobile station 12 is ordered to use the first wireless interface W1 for the traffic, which traffic is then transported through the first communication network 14 in normal fashion. One example way to order the mobile station 12 to use specific interface for specific traffic is to use the ANDSF principles.

Furthermore since an association has been made, it is in some variations also possible that the traffic control unit 40 instead selects to transfer traffic of the first wireless interface through the second communication network instead.

Figure 5:
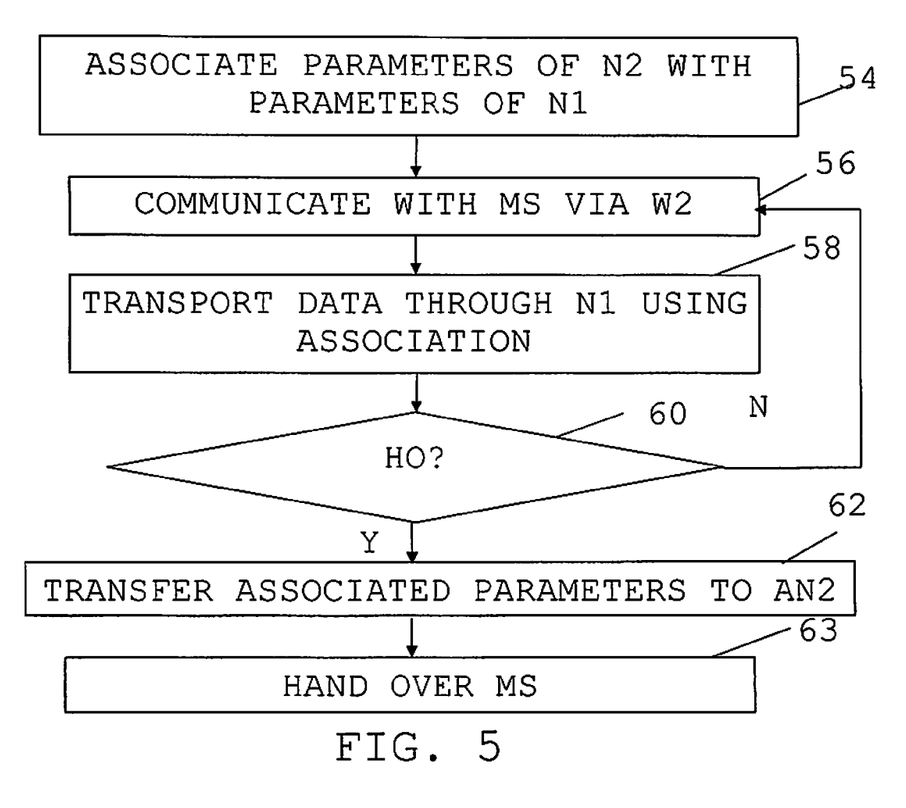
FIG. 5 shows a flow chart of a number of steps in a second embodiment of a method for providing communication with a mobile station.
Figure 6:
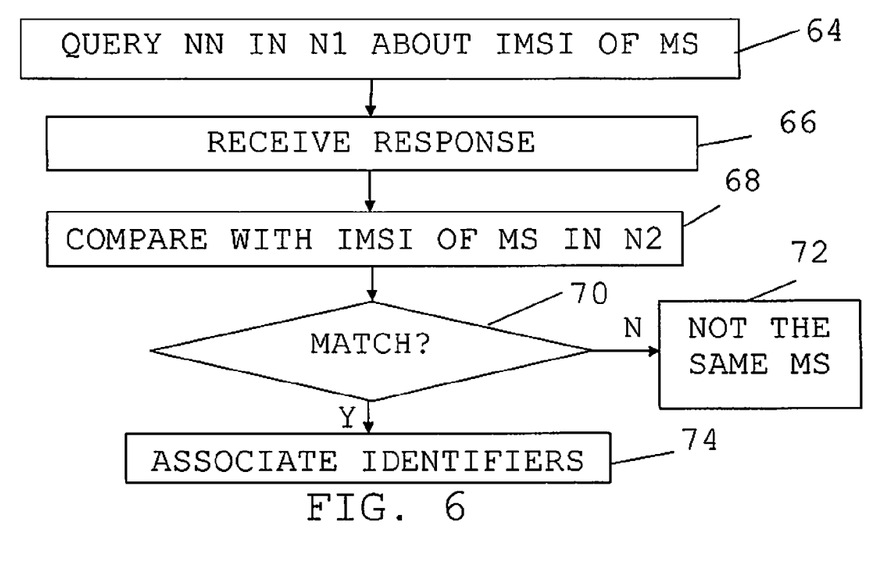
FIG. 6 shows a flow chart of a number of method steps depicting a first variation of associating identifiers of the two communication networks.
Figure 7:
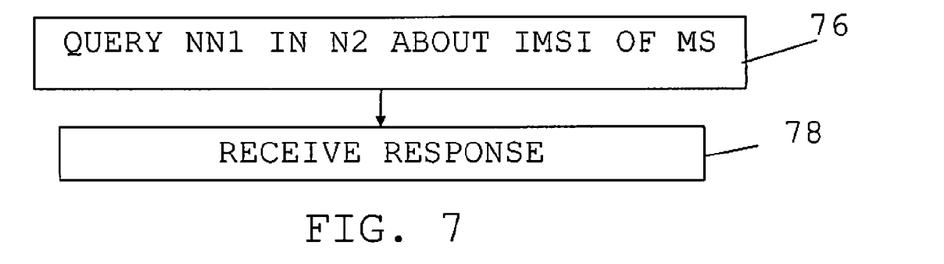
FIG. 7 shows a flow chart of a number of method steps depicting a second variation of associating identifiers of the two communication networks.
Figure 8:
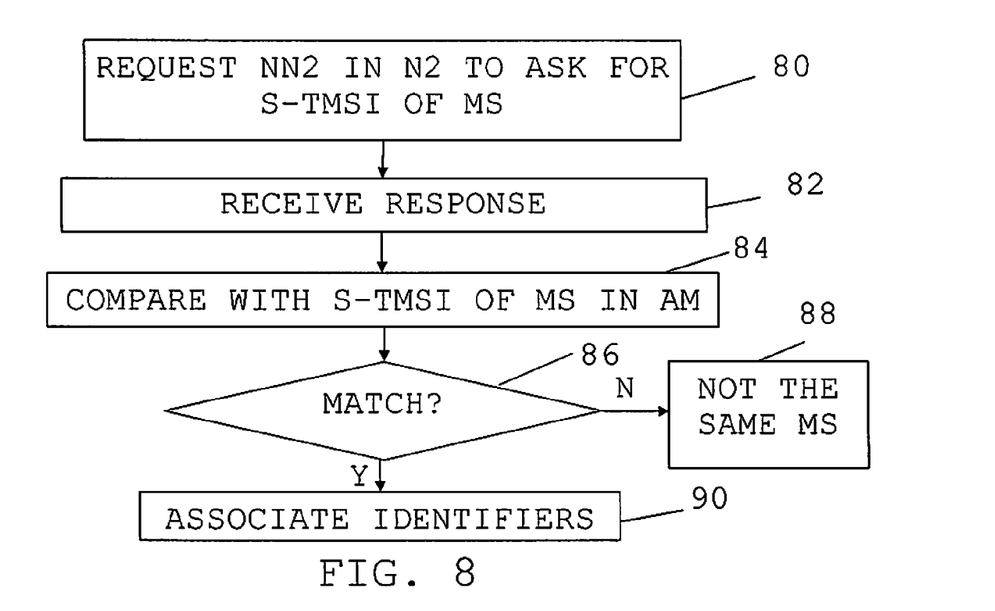
FIG. 8 shows a flow chart of a number of method steps depicting a third variation of associating identifiers of the two communication networks, FIG. 9 schematically shows a computer program product with computer program software which implements units of the first wireless access point when being loaded into a program memory of the first wireless access point.

Now a second more detailed embodiment will be described with reference being made to FIG. 1-3 as well as to FIGS. 5, 6, 7 and 8, where FIG. 5 shows a flow chart of a number of steps in a method for providing communication with the mobile station, FIG. 6 shows a flow chart of a number of method steps depicting a first variation of associating identifiers of the two communication networks, FIG. 7 shows a flow chart of a number of method steps depicting a second variation of associating identifiers of the two communication networks and FIG. 8 shows a flow chart of a number of method steps depicting a third variation of associating identifiers of the two communication networks.

In order to ensure that the association is performed between the correct identifiers reflecting the same mobile station 12 it is necessary to base the association on a unique identifier of the mobile station 12, which is typically a unique identifier used in the first communication network 14. This unique identifier may be the IMSI of the mobile station. The IMSI is in many cases also used in the second communication network 16.

There is however a problem in that this particular identifier is rarely used in the first radio communication unit 34 of the first wireless access point 10. The mobile station 12 is typically identified using a temporary non-unique identifier of the first communication network 14 and sometimes also in the second communication network 16. When this is the case the unique identifier has to somehow be obtained in order to associate the right identifiers with each other.

The IMSI may thus be needed as the common identifier used in the two parts that handle communication between the mobile station 12 and the first and the second communication networks 14 and 16, i.e. in both the LTE and Wi-Fi part of the combined or joint wireless access point in order to be able to identify and associate data flows belonging to one mobile station on the different wireless interfaces W1 and W2.

Various ways in which this may be done will be described shortly.

It is first assumed that the IMSI is known through both communication networks 14 and 16. In this case the various identifiers of the mobile station are associated with each other based on the IMSI. A first identifier is thus associated with a second identifier for enabling transporting, step 54. This means that any temporary identifiers are associated with each other. The association may furthermore comprise the association of the communication address IP ADR1 assigned to the mobile station 12 in the first communication network 14 with the communication address IP ADR2 assigned to mobile station 12 in the second communication network 16 as well as to the communication address MAC ADR of the mobile station used via the second wireless interface W2. This thus means that connectivity parameters of the mobile station 12 in the second communication network 16 are associated with connectivity parameters of the mobile station in the first communication network 14, step 54, which address is typically a so-called MAC address. This association is performed by the mapping unit 42.

The mapping unit 42 handles the associations between the different identifiers used in the SAE/LTE and Wi-Fi sides and performs the needed Network Address Translation (NAT) functionality when the Wi-Fi user plane traffic is injected to a GTP-U tunnel provided for the mobile station 10 in SAE/LTE. The identifiers used may be the communication address MAC ADR of the mobile station used via the second wireless interface W2 or the Wi-Fi MAC address, NAT information and state and the communication addresses assigned to the mobile station in the two communication networks, i.e. the UEs IP addresses in the core network (CN) and IMSI.

Thereafter the first wireless access point 10 communicates with the mobile station 12 via the second wireless interface W2, step 56, which may involve both receiving traffic from the mobile station 12 and transmitting traffic to the mobile station 12 via the second wireless interface W2. The communication is here performed using the second radio communication circuit 38 and second antenna 36. The data exchanged in this way is then transported through the first communication network using the made association, step 58. That traffic is more particularly injected by the transport control unit 40 into a tunnel set up for the mobile station 12 in the first communication network 14 via the communication interface 48, for instance using the S-TMSI of the mobile station. The communication address IP ADR2 assigned to the mobile station in the second communication network 16 may more particularly be translated to the communication address IP ADR1 assigned in the first communication network 14. This may be needed so that the user plane packets received over Wi-Fi may be injected to the correct GTP-U tunnels in the S1-U interface and transported between the first wireless access point 10 and serving gateway 22 in this tunnel.

It is in this way possible to provide communication of the second type through the first communication network 14, the SAE/LTE network. Therefore, based on the described method the combined LTE eNodeB and Wi-Fi wireless access point 10 is able to associate the LTE and Wi-Fi traffic belonging to one mobile station, which association is then stored in the association memory 44 by the mapping unit 42.

When the mobile station 12 sends traffic via the first wireless interface W1, the traffic control unit 40 is not doing anything. The operation of the node, which is provided through the first radio communication unit 34, is in this case LTE eNodeB operation and the user plane traffic of the communication type is injected to the GTP-U tunnel towards the serving GW 22.

However, when the mobile station 12 sends traffic via the second wireless or Wi-Fi radio interface W2, the traffic control unit 40 may start to operate. The main principle is as follows:

When the mobile station initiated communication with the first radio communication unit 34, i.e. attached to the LTE eNB-side, it was allocated a communication address IP ADR1 in the selected PDN-GW 24. At least one GTP-U tunnel was also allocated for the mobile station. The tunnel may then be identified by a Tunnel End-Point Identifier (TEID) as well as a Serving GW-GTP-IP-Address and an eNB-IP-Address, i.e. by communication addresses assigned to the serving gateway 22 and to the first wireless access point 10 in the first communication network 14.

When the mobile station 12 initiated communication with the second radio communication unit 38 via the second wireless interface W2, i.e. attached to the Wi-Fi side, it was also allocated a communication address IP ADR2 in the second communication network 16, for example by the Wi-Fi access controller 28 or in some cases by the second radio communication unit 38. This IP-address is also referred to as Wi-Fi-allocated-IP.

The basic identifiers used by the traffic control unit 40 are the following that are provided in the association memory 44:
  unique identifier of the mobile station IMSI
  temporary first communication network identifier S-TMSI
  communication address MAC ADR of the mobile station 12 used via the second wireless interface W2, i.e. the Wi-Fi MAC address,
  communication address IP ADR2 assigned in the second communication network or Wi-Fi-allocated-IP-address
  communication address IP ADR1 assigned in the first communication network or CN-allocated-IP-address The main purpose of the traffic control unit 40 is to inject user plane traffic received via the second wireless interface W2 to one of the GTP-U tunnels towards the serving gateway 22. The same behavior applies also in the downlink direction i.e. some part of the traffic received on a GTP-U tunnel is sent to the mobile station via the second wireless interface W2.

The traffic control unit 40 performs the following packet conversion according to the association in relation to transported traffic:
  In the uplink direction, the source IP-address is the Wi-Fi-allocated-IP address in the IP packets received from the mobile station, where the Wi-Fi-allocated-IP address is the communication address assigned to the mobile station in the second communication network. This address needs to be changed to the CN-allocated-IP address with a NAT-function, where the CN-allocated-IP address is the communication address assigned to the mobile station in the first communication network.
  In the downlink direction, the destination IP-address is the CN-allocated-IP in the IP packets received from the Serving GW 22. This needs to be changed to the Wi-Fi-allocated-IP address with a NAT-function.

The above-mentioned function is performed through the traffic control unit 40 investigating the parameter settings in the association memory 44 and then transporting the traffic based on these associations.

During the communication of the mobile station 12 it is possible that the mobile station 12 moves out of reach of the first wireless access point 10, for instance out of reach of both wireless interfaces W1 and W2. It may for instance move to the vicinity of the second access point 11. It may in this case be necessary to hand over the mobile station 10 to this second wireless access point 11.

For this reason the handover handling unit 46 continuously investigates if a handover is to be made, step 60. This handover investigation may be performed in normal fashion, for instance through investigation various signal strength measurements.

If no handover is to be made, step 60, then the access point continues communicating with the mobile station, step 56, and transports traffic through the first communication network 14, step 58. However if handover is to be made, step 60, the handover handling unit 46 fetches the parameter associations for the mobile station 10 in the association memory 44 and transfers these to the second access point 11. In this way data about the associations is forwarded to the second wireless access point 11 for allowing the mobile station 12 to retain flexibility when handed over to the second wireless access point 11. The transfer may here be made via the X2 interface for instance as a part of an X2AP Handover preparation phase. As an alternative it is possible to relay the parameters via a node in the first communication network 14, such as the MME 26. The parameters may then be provided in an S1-interface based handover preparation phase as part of the RAN transparent container information elements or a separate information element. Thereafter the mobile station is handed over, step 63.

In this way the associations made in the association memory 44 are forwarded from the source access point, the first wireless access point 10, to the target access point, the second wireless access point 11, to enable a traffic control unit in the target access point to also allow the first communication network 14 to be used for the second type of communication.

As mentioned above it is necessary to perform the association based on a unique identifier of the mobile station such as the IMSI. One specific area that needs to be solved for this case is the retrieval of IMSI to the LTE eNodeB, i.e. to the part of the first wireless access point 10 used for communicating with the first communication network 14, and different solutions are described for this. The IMSI is needed as the common identifier used in both the LTE and Wi-Fi parts of the combined access point to be able to identify and associate the flows belonging to one mobile station on the different accesses (i.e. LTE and Wi-Fi). This is needed so that the user plane packets received over Wi-Fi may be injected to the correct GTP-U tunnels in the S1-U interface.

In case the first wireless access point 10 has received the IMSI from both networks then there is no problem, then the identifiers, and addresses used may be associated with each other.

In a first variation shown in FIG. 6, the first identifier is a temporary identifier S-TMSI and the second identifier may be the unique identifier in the second communication network 16. In order to be able to associate the first and second identifiers, the unique IMSI of the first communication network 14 has to be obtained. This is then obtained from a network node NN in the first communication network 14. This IMSI may be obtained through the mapping unit 42 querying, via the communication interface 48, the network node NN in the first communication network 14 about the unique identifier of the mobile station 12, here the IMSI, step 64. It could be a query about the IMSI associated with a known S-TMSI. The mapping unit 42 then receives a response from the queried network node via the communication interface, step 66, and compares the response with the unique identifier or IMSI of the mobile station 12 used in the second communication network 16, step 68. If there is a match, step 70, then the first and the second identifiers are associated with each other, step 74, but if there is no match, step 70, the mobile station is deemed to be another mobile station, step 72.

The query could be sent to and the response received from the MME 26 on the S1-MME interface. Here it could be possible to extend a so-called S1AP-procedure with the MME including the IMSI for example in the UE context setup procedures.

As an alternative or in addition a query could be sent to and the response received from the serving gateway 22 on the S1-U interface signalling. The IMSI could for instance be included in a GTP-U header extension field from the serving gateway 22 down to the first wireless access point 10. The PDN gateway 24 may include the IMSI in this case in the downlink messages in the case of GTP-based S5-interface (GTP-U header extension field) and the serving gateway 22 would merely copy the information over to the S1-U interface.

These were two examples of finding the IMSI in the first communication network.

If EAP-SIM/AKA authentication is based on IMSI identifier, then the IMSI is, as was mentioned earlier, already available in the second radio communication unit 38 of the first wireless access point 10.

However, the IMSI is not always known by the second radio communication unit 38. This means that the second identifier is a temporary identifier. In this case the unique identifier of the second communication network 16 may need to be obtained before associations may be made. One way in which this may be handled will now be described with reference being made to FIG. 7.

In the case when the temporary identifiers RE-RUTH ID in the form of the fast re-authentication identifiers are used then it is the AAA server 30 that knows the association between an IMSI and a fast re-authentication identifier.

The mapping unit 42 in this case obtains the IMSI from a first network node NN1 of the second communication network 16. This may be done through the mapping unit 42 sending a query intended for the AAA server 30 about the IMSI of the mobile station 12 via the communication interface 48, step 76, and then receiving a response to the query from the AAA server 30, step 78. The query may be based on the temporary re-authentication identifier used in the second communication network, when the temporary identifier is the second identifier. The query could be first sent to a network node such as the access control node 28, which acts as an authenticator. This node would then forward the query to the AAA server 30. The AAA server 30 could then inform the access control node 28 about the IMSI and the access control node 28 could therefore forward the information to the mapping unit 42 of the first wireless access point 10 or joint node. As may be seen this second variation may be combined with the first variation. As an alternative, the first wireless access point 10, which functions as a joint node or joint access point, may send the query directly to the AAA server 30. In this case the second communication network may also be provided without the access control node.

A third variation of performing association will now be described with reference being made to FIG. 8. Here the mapping unit 42 obtains the temporary identifier of the first communication network 14 through requesting a second network node NN2, in this case the access control node 28, which acts as authenticator, to ask for the S-TMSI of the mobile station in the first communication network 14, step 80. It may thus be seen that the mapping unit 42 obtains a temporary identifier of the first communication network 14, which identifier through being fetched via the second communication network 15, is also associated with the unique identifier of the second communication network. The access control node 28 then contacts the MME node 26 in the first communication network 14 that the mobile station 12 is attached to based on the IMSI. This may be achieved through the access control node 28 or the AAA server 30 contacting the HSS server 27 and asking about the serving MME for the mobile station 12. In the latter case the AAA server 30 would then inform the access control node 28 about the serving MME 26. Then the access control node 28 contacts the serving MME 26 having the IMSI and asks for the temporary identifier S-TMSI currently used for the mobile station 12 in the SAE/LTE side, i.e. in the first communication network 14.

Once the access control node 28 gets this information, it forwards it to the mapping unit 42 of the first wireless access point 10 and now it is possible to combine the mobile station context in both LTE and Wi-Fi sides, i.e. to associate the identifiers used in both the communication networks with each other. After having received the response, step 82, the mapping unit 42 thus compares the S-TMSI received from the second network node NN2 in the second communication network 16 with the S-TMSI from the first communication network 14, step 84, and if there is a match, step 86, then identifiers are matched, step 90, while if there is no match, step 86, then the mobile station is deemed to be a different mobile station, step 88. It is in this case not necessary to actually store the IMSI in the association memory 44, since the S-TMSI is known on both sides. This solution can be seen as a standalone solution and may be used without the identification described in relation to FIG. 6. It can be seen that the first identifier is a temporary identifier and the second identifier is either a temporary or a unique identifier.

Figure 10:
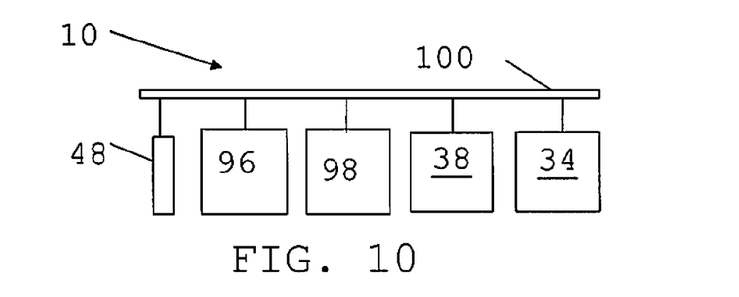
FIG. 10 shows one physical realization of the first wireless access point.

The traffic control unit, mapping unit and handover handling unit may be implemented through hardware. One or more of the units may also be implemented in the form of a processor and a program memory, where the memory would include software implementing the functionality of the various units. The memory could then also comprise the association memory. One such realization is shown in FIG. 10, where there is a bus 100, to which is connected the first and second radio communication units 34 and 38, the communication interface 48 and a processor 96 and program memory 98 together implementing the traffic control unit, mapping unit and handover handling unit. The traffic control unit, mapping unit and handover handling unit may also be implemented through chip sets and/or special purpose microprocessors such as ASICs (Application Specific Integrated Circuit) or Field-Programmable Gate Array (FPGA).

The transport control unit, mapping unit and handover handling unit may also be provided in the form of software, through a computer program with computer program code implementing these units. Such a program may for instance be a program on an external server, and then downloaded to a server which is to act as the first wireless access point.

Figure 9:
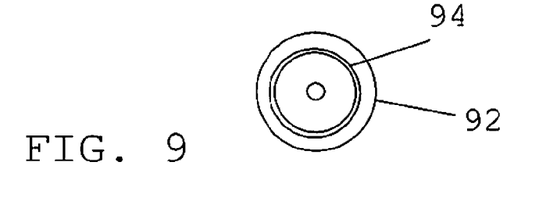

The computer program code may also be provided on a computer readable means, for instance a computer readable means in the form of a data carrier, like a CD ROM disc, a flash memory, an EEPROM memory or a memory stick carrying such a computer program with the computer program code, which will implement the function of the traffic control unit, mapping unit and handover handling unit when being loaded into a computer. One such computer program product comprising a computer readable means in the form of a CD ROM disc 92 with the above-mentioned computer program 94 is schematically shown in FIG. 9.

While the disclosure has been made in connection with what is presently considered to be most practical and preferred embodiments, it is to be understood that the disclosure is not to be limited to the described embodiments, but on the contrary, is intended to cover various modifications and equivalent arrangements. LTE and Wi-Fi are for instance merely examples of communication types that may be used. The identifiers stored in the association memory may also be varied. If for instance, the access control node retrieves the S-TMSI from the MME node and then forwards it to the mapping unit of the first wireless access point and temporary identifiers are used in both the first and the second communication network then it would be sufficient to store these temporary identifiers in the association memory. The IMSI need not be stored.

It should also be realized that the querying and requesting being performed in the first, second and third variations described above are optional. The nodes receiving such queries and/or requests may as an alternative send identifiers on their own initiative.

Therefore the disclosure is only to be limited by the following claims.

The invention claimed is:

1. A method for providing communication with a dual mode mobile station via a first wireless access point, comprising:
   communicating with the dual mode mobile station via a first wireless interface (W1) for a first type of wireless communication in relation to a first communication network, wherein a first identifier is used for communicating with the first communication network;
   communicating with the dual mode mobile station via a second wireless interface (W2) for a second type of wireless communication in relation to a second communication network, wherein a second identifier is used for communicating with the second communication network;
   associating the first identifier with the second identifier to associate the first type of wireless communication for the dual mode mobile station with the second type of wireless communication for the dual mode mobile station, wherein the first identifier comprises a temporary subscriber identifier (S-TMSI) associated with the dual mode mobile station in the first communication network; and
   transporting traffic of the second type of wireless communication for the dual mode mobile station through the first communication network based on the association of the first identifier with the second identifier, and
   wherein transporting the traffic comprises using the first identifier to inject the traffic into a tunnel in the first communication network via the first wireless interface (W1).

2. The method according to claim 1, wherein there exists a unique identifier associated with the dual mode mobile station in the first communication network and a unique identifier associated with the dual mode mobile station in the second communication network.

3. The method according to claim 2, further comprising obtaining the unique identifier associated with the dual mode mobile station in the first communication network from at least one network node in the first communication network and performing the associating of the first identifier with the second identifier in response to determining that the unique identifier of the first communication network matches the unique identifier of the second communication network.

4. The method according to claim 3, wherein the at least one network node comprises a mobility management node.

5. The method according to claim 3, wherein the at least one network node comprises a serving gateway node.

6. The method according to claim 2, wherein the second identifier is the unique identifier of the second communication network.

7. The method according to claim 2, wherein the second identifier is a temporary identifier (RE-AUTH ID) associated with the dual mode mobile station in the second communication network and further comprising obtaining the unique identifier of the second communication network from a network node in the second communication network.

8. The method according to claim 6, further comprising obtaining a temporary identifier (S-TMSI) of the first communication network associated with the unique identifier of the second communication network from a network node in the second communication network and performing said associating if the obtained temporary identifier matches the first identifier.

9. The method according to claim 1, wherein the associating the first type of wireless communication to the second type of wireless communication further comprises associating a communication address assigned to the dual mode mobile station in the first communication network to a communication address assigned to the dual mode mobile station in the second communication network and to a communication address of the dual mode mobile station used via the second wireless interface.

10. The method according to claim 9, further comprising performing packet conversion according to the association in relation to transported traffic.

11. The method according to claim 1, further comprising forwarding data about the association to a second wireless access point in order to allow the dual mode mobile station to be handed over to the second wireless access point.

12. A wireless access point for providing communication with a dual mode mobile station, the wireless access point comprising:
   a first wireless interface (W1) for communicating a first type of wireless communication to the to the dual mode mobile station in relation to a first communication network, wherein a first identifier is used for communicating with the first communication network,
   a second wireless interface (W2) for communicating a second type of wireless communication to the dual mode mobile station in relation to a second communication network,
   at least one processor operable to:
      use a first identifier for communicating with the first communication network,
      use a second identifier for communicating with the second communication network,
      associate the first identifier with the second identifier to associate the first type of wireless communication for the dual mode mobile station with the second type of wireless communication for the dual mode mobile station, wherein the first identifier comprises a temporary subscriber identifier (S-TMSI) associated with the dual mode mobile station, and
      transmit traffic of wireless communication of the second type for the dual mode mobile station through the first communication network based on the association of the first identifier with the second identifier, and
      wherein transmitting the traffic comprises using the first identifier to inject the traffic into a tunnel in the first communication network via the first wireless interface (W1).

13. The wireless access point according to claim 12, wherein there exists a unique identifier associated with the dual mode mobile station in the first communication network and a unique identifier associated with the dual mode mobile station in the second communication network.

14. The wireless access point according to claim 13, wherein the at least one processor is further operable to obtain the unique identifier associated with the dual mode mobile station in the first communication network from at least one network node in the first communication network and perform the associating of the first identifier with the second identifier if the unique identifier of the first communication network matches the unique identifier of the second communication network.

15. The wireless access point according to claim 14, wherein the at least one network node comprises a mobility management node.

16. The wireless access point according to claim 14, wherein the at least one network node comprises a serving gateway node.

17. The wireless access point according to claim 13, wherein the second identifier is the unique identifier of the second communication network.

18. The wireless access point according to claim 13, wherein the second identifier is a temporary identifier (RE-AUTH ID) associated with the dual mode mobile station in the second communication network and at least one processor is further operable to obtain the unique identifier of the second communication network from a network node in the second communication network.

19. The wireless access point according to claim 17, wherein the at least one processor is further operable to obtain a temporary identifier (S-TMSI) of the first communication network associated with the unique identifier of the second communication network from a network node in the second communication network and perform said associating in response to determining that the obtained temporary identifier matches the first identifier.

20. The wireless access point according to claim 12, wherein the at least one processor is further operable to perform packet conversion according to the associations.

21. The wireless access point according to claim 12, wherein the at least one processor is further operable to forward data about the association to another wireless access point in order to allow the dual mode mobile station to be handed over to the other wireless access point.

22. The wireless access point according to claim 12, wherein the first communication network is a System Architecture Evolution/Long Term Evolution network and the first wireless interface is an eNodeB Uu interface of the System Architecture Evolution/Long Term Evolution network.

23. The wireless access point according to claim 12, wherein the second communication network is a core network and the second wireless interface is an IEEE 802.11 interface of a wireless local area network.

* * * * *